United States Patent [19]

Pentith

[11] Patent Number: 4,623,061
[45] Date of Patent: Nov. 18, 1986

[54] BELT CONVEYOR ARRANGEMENT

[75] Inventor: Gerald R. O. Pentith, Sturgis, Ky.

[73] Assignee: Continental Conveyor and Equipment Company, Inc., Winfield, Ala.

[21] Appl. No.: 642,630

[22] PCT Filed: Feb. 16, 1984

[86] PCT No.: PCT/GB84/00043
§ 371 Date: Aug. 13, 1984
§ 102(e) Date: Aug. 13, 1984

[87] PCT Pub. No.: WO84/03272
PCT Pub. Date: Aug. 30, 1984

[30] Foreign Application Priority Data

Feb. 18, 1983 [GB] United Kingdom ............... 8304634
Dec. 8, 1983 [GB] United Kingdom ............... 8332831

[51] Int. Cl.⁴ .................................................. B65G 23/18
[52] U.S. Cl. ........................................ 198/805; 198/833
[58] Field of Search .................... 198/805, 833, 839; 104/282; 474/111, 140, 142; 74/DIG. 4

[56] References Cited

U.S. PATENT DOCUMENTS

| 476,787 | 6/1892 | Dale | 198/839 X |
| 870,050 | 11/1907 | Robbins | 198/833 X |
| 2,732,058 | 1/1956 | Nigra et al. | 198/839 |
| 2,732,930 | 1/1956 | Thomson | 198/833 X |
| 2,751,065 | 6/1956 | Thomson | 198/833 |
| 2,903,123 | 9/1959 | Naylor | 198/833 X |
| 3,169,632 | 2/1965 | Kain | 198/805 |
| 3,497,056 | 2/1970 | Clark | 198/805 |

Primary Examiner—Joseph E. Valenza
Assistant Examiner—Jonathan D. Holmes
Attorney, Agent, or Firm—James H. Tilberry

[57] ABSTRACT

A continuous belt (14) has upper and lower runs (14a, 14b) and is supported by upper and lower runs (23a, 23b) of steel ropes (23) carried and driven by roller (12, 13). The ropes (23) are supported on wheels (22) carried by a frame (11). Rollers (30) invert the lower run of the belt and lead it onto the lower run of the ropes. Magnetic members (50) are secured to the belt and hold the belt relative to the ropes to inhibit relative movement and reduce wear.

8 Claims, 4 Drawing Figures

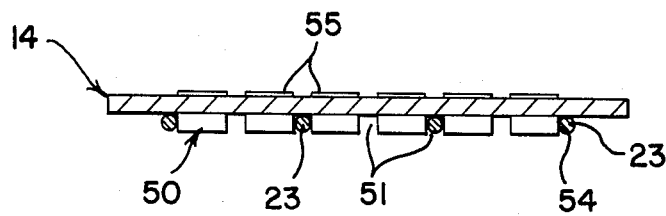
FIG. 2
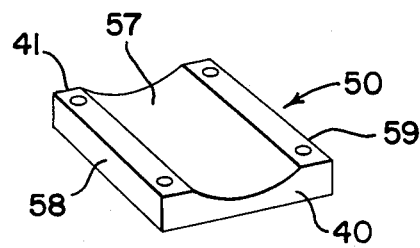
FIG. 3
FIG. 4
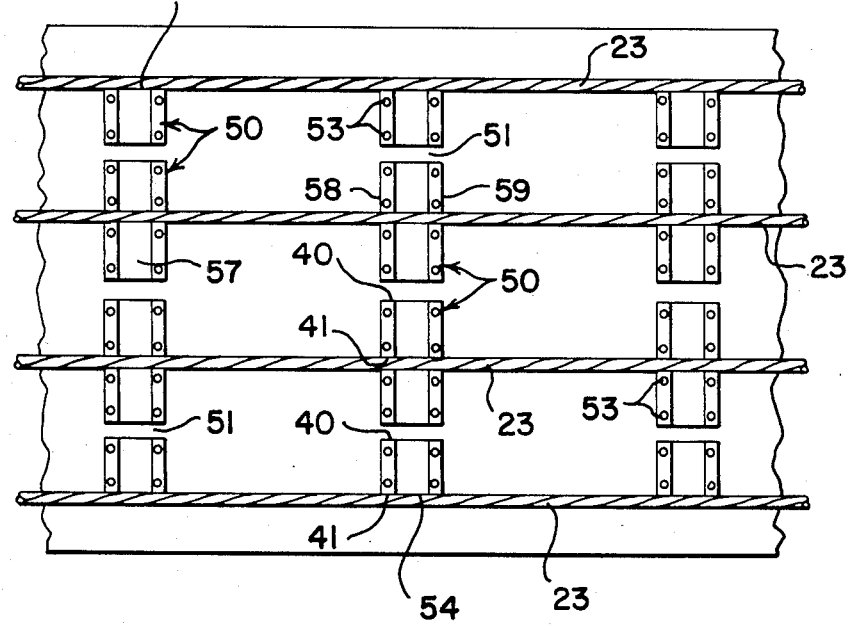

BELT CONVEYOR ARRANGEMENT

This arrangement relates to belt conveyor arrangements for example, for transporting bulk materials over long distances. Such arrangements are used for removing coal from a mine and transporting rock from quarries.

With very long belts, there is a risk that the belt will move laterally relative to the belt supports. This results in uneven loading on the supports and also in wear of the belt due to slippage.

One type of conveyor arrangement has steel ropes which support the belt, the ropes extending longitudinally of the belt. Each rope is in turn, supported by wheels. The belt has shaped longitudinal ribs for engaging the ropes. An arrangement of this type is disclosed in Great Britain Pat. No. 1,591,461, published June 24, 1981. It is possible for the ribs to become displaced laterally from the rope and an object of this invention is to overcome this problem and to reduce slippage between the belt and the ropes so that wear is reduced.

In accordance with this invention, there is provided a belt conveyor arrangement comprising a belt and a support assembly for carrying the belt, the support assembly including an elongate frame having a roller at each end, at least one of the rollers being driven, the belt being continuous and passing around the rollers, and magnetic means providing attraction forces between the belt and the support arrangement to inhibit movement between the belt and the support arrangement.

The invention is particularly applicable to a conveyor arrangement wherein the support assembly includes a multiplicity of rotatable members carried at spaced intervals along the frame and ropes engaged with the rotatable members, the belt being provided with the magnetic means and the ropes being constructed to be magnetically attracted to the magnetic means. The magnetic means preferably defines recesses for mechanically locating the ropes relative to the belt.

The invention may result in a conveyor belt having formations for mechanically locating the belt on support ropes extending longitudinally of the belt, each formation being defined by magnet members mounted at spaced intervals along the belt.

Reference is now made to the accompanying drawings, wherein:

FIG. 2 is a cross-sectional view of the belt of the arrangement;

FIG. 3 is a perspective view of a magnetic block; and

FIG. 4 is an underside plan view of the top run of the belt.

Figure 1:
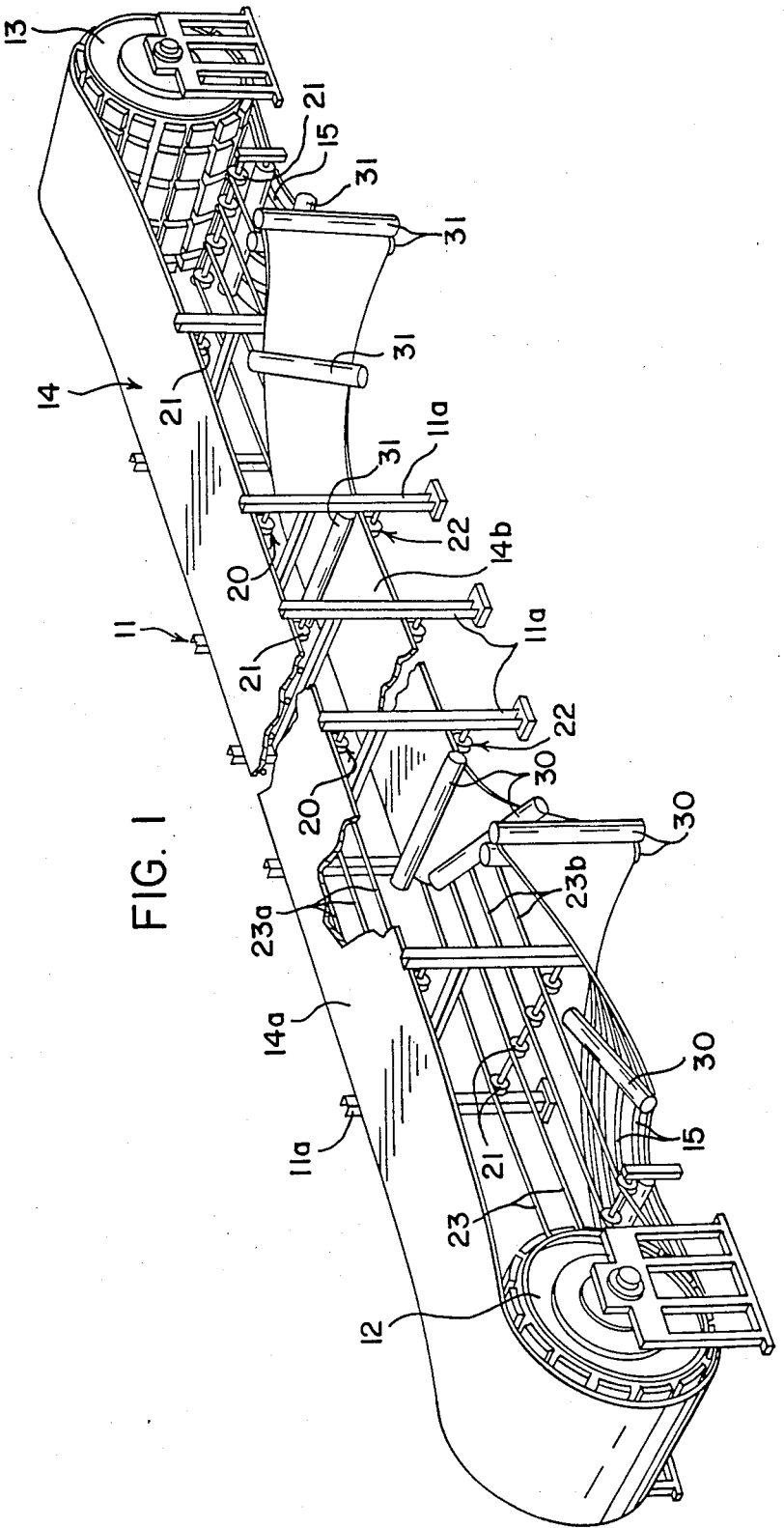
FIG. 1 is a perspective view of a conveyor arrangement according to the invention.

The conveyor arrangement comprises an elongate frame 11, only the uprights 11a of which are illustrated for clarity. The uprights are interconnected by horizontal members, cross-pieces and diagonal braces (not shown) in conventional manner, e.g. as disclosed in Great Britain Pat. No. 1,591,461, published June 24, 1981. At each end of the frame is mounted a roller or pulley 12, 13, at least one of which is driven, and a continuous or endless belt 14 passes over the rollers. The rollers 12, 13 and the drive means therefor, may also be conventional.

Between the rollers, at spaced intervals, the frame is provided with upper rows 20 of wheels 21 and lower rows 22 of such wheels. The wheels are freely rotatable. Each row 20, 22, which extends laterally of the frame, comprises a plurality of spaced wheels 21, in this example four. Each wheel has a peripheral channel for receiving and guiding a rope 23.

A plurality of continuous steel ropes or cables 23 are provided for supporting the belt 14. Each rope corresponds to one of the wheels 21 in each row 20, 22, and has an upper run 23a supported on the wheels 21 of the upper rows 20 and a lower run 23b supported on the wheels 21 of the lower rows 22.

The upper conveying run 14a of the belt 14 is supported by the upper run 23a of the ropes. As the lower run 14b of the belt 14 leaves the roller 12, it is diverted by rollers 30 from its normal path, twisted, and inverted to return to its normal path engaged on top of the lower runs 23b of the ropes 23. Before the belt reaches the other roller 13, rollers 31 again divert and invert the belt 14 and return it to a position below the ropes 23. The long lower run of the belt is, therefore supported substantially throughout its run.

This arrangement permits use of cheap material for construction of the belt without any special reinforcement laterally. The belt will be strong in use due to the substantial support provided by the ropes.

Magnetic means is provided to resist movement between the belt and the ropes, so that wear due to slippage is reduced. The belt may have longitudinal strips which engage the ropes, as in Great Britain Pat. No. 1,591,461 and these strips may include elements which are magnetically attracted to rope or to the wheels. Electromagnets may be provided to act through the wheels.

It is preferred, however, to avoid providing these longitudinal strips and to provide the arrangement illustrated in FIGS. 2 to 4. A multiplicity of magnetic blocks 50 are mounted on the inner face of the belt 14. (These are not shown in FIG. 1 for clarity). The blocks are arranged in rows extending laterally of the belt, the rows being spaced longitudinally of the belt.

The blocks in each row are spaced to define recesses 51 and the ropes 23 are mechanically located in the recesses or in rebates 54 defined by the blocks at the ends of each row. Each block is bolted to a plate 55 on the upper side of the belt 14, with the bolts 53, passing through the belt, so as to secure the blocks to the belt.

As shown in FIG. 3, each block has a groove 57, so that the thickness of the block varies from a maximum along two opposite edges 58, 59 to a minimum mid-way between those edges. This concentrates the magnetic flux in the region of each end 40, 41 of the block. The blocks are arranged so that these ends 40, 41 lie adjacent the ropes 23 and magnetically grip the ropes, so as to prevent the belt from moving relative to the ropes, the ropes being made of steel.

This arrangement prevents damage due to the belt shifting relative to the ropes as well as wear due to relative vibration between the belt and the ropes.

Due to the inversion of the lower run 14b of the belt, the magnetic blocks 50 engage both the upper run 23a and the lower run 23b of the ropes and the blocks only need to be provided on the inner face of the belt.

I claim:

1. A belt conveyor arrangement comprising an elongate frame, a roller journaled at each end of said frame, at least one of said rollers being driven, an endless belt passing around said rollers and having an upper conveying run and a lower return run, said upper run of said belt having an outer surface and an inner surface, a plurality of laterally spaced and longitudinally spaced magnetic members mounted on said inner surface of said belt, said magnetic members being in alignment to define a plurality of longitudinally aligned recesses, a plurality of laterally spaced and longitudinally extending steel cables trained about said rollers and riding in said recesses to support said belt.

2. A belt conveyor arrangement as set forth in claim 1 wherein each of said magnetic members have a pair of spaced side edges adjacent said recesses and an intermediate portion therebetween, and said intermediate portion being recessed to provide a thickness thereto that is less than the thickness at said side edges to thereby concentrate the magnetic flux of said magnetic members at said side edges.

3. A belt conveyor arrangement as set forth in claim 2 wherein inverting means are located adjacent each of said rollers along said return run for inverting said belt as said belt leaves one of said rollers and reinverting said belt as said belt moves onto the other one of said rollers to thereby maintain support for said belt by said cables on said conveying run and on said return run.

4. A belt conveyor arrangement comprising an elongate frame, a roller journaled at each end of said frame, means operatively connected to one of said rollers for rotating said one roller, an endless flat flexible belt trained around said rollers, said belt having an upper conveying run and a return run, said upper run of said belt having an outer surface and an inner surface, a plurality of laterally spaced and longitudinally spaced magnetic members mounted on said inner surface, said magnetic members being laterally aligned and longitudinally aligned in rows, said magnetic members having side edges, a plurality of laterally spaced metallic cables extending in parallel relationship around said rollers for supporting said flat belt, and said cables abuttingly contacting certain ones of said side edges of said magnetic members to prevent said belt from moving relative to said cables.

5. A belt conveyor arrangement as set forth in claim 4 wherein inverting means are located adjacent each of said rollers along said return run for inverting said belt as said belt leaves said one roller and inverting said belt as said belt moves onto the other one of said rollers to thereby maintain support for said belt by said cables on said conveying run and on said return run.

6. A belt conveyor arrangment as set forth in claim 5 wherein adjacent ones of said magnetic members define a plurality of recesses, and certain ones of said cables are each received by a respective one of said recesses.

7. A belt conveyor arrangement as set forth in claim 6 wherein each of said magnetic members is rectangular in shape, each of said magnetic members having an intermediate portion located between the side edges of a common magnetic member, each of said magnetic members is flat and of equal thickness along said side edges, said intermediate portion being arcuately recessed to provide a thickness that is less than said thickness along said side edges.

8. A belt conveyor arrangement as set forth in claim 7 wherein the thinnest cross-section of said arcuate portion is approximately one-half of the thickness of said side edges.

* * * * *